United States Patent
Heinrich et al.

(10) Patent No.: US 8,270,676 B2
(45) Date of Patent: Sep. 18, 2012

(54) METHOD FOR AUTOMATIC FULL BEAM LIGHT CONTROL

(75) Inventors: Stefan Heinrich, Achern (DE); Thomas Fechner, Kressbronn (DE); Carlos Almeida, Lindau (DE); Dieter Kroekel, Eriskirch (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 743 days.

(21) Appl. No.: 12/311,636

(22) PCT Filed: Oct. 29, 2007

(86) PCT No.: PCT/DE2007/001935
§ 371 (c)(1),
(2), (4) Date: Apr. 6, 2009

(87) PCT Pub. No.: WO2008/064625
PCT Pub. Date: Jun. 5, 2008

(65) Prior Publication Data
US 2009/0296415 A1 Dec. 3, 2009

(30) Foreign Application Priority Data
Nov. 27, 2006 (DE) .......................... 10 2006 055 908

(51) Int. Cl.
*G06K 9/00* (2006.01)
(52) U.S. Cl. ....................................... 382/104; 362/465
(58) Field of Classification Search .................. 382/100, 382/104; 362/465
See application file for complete search history.

(56) References Cited

U.S. PATENT DOCUMENTS

| 5,837,994 | A | 11/1998 | Stam et al. |
| 5,990,469 | A | 11/1999 | Bechtel et al. |
| 6,559,435 | B2* | 5/2003 | Schofield et al. ........... 250/208.1 |
| 6,717,518 | B1 | 4/2004 | Pirim et al. |
| 7,046,822 | B1 | 5/2006 | Knoeppel |
| 7,625,107 | B2* | 12/2009 | Brod ............................ 362/464 |
| 2002/0057573 | A1* | 5/2002 | Kondo et al. ................. 362/465 |

(Continued)

FOREIGN PATENT DOCUMENTS
DE 30 33 785 10/1982
(Continued)

OTHER PUBLICATIONS

International Preliminary Report on Patentability for Application No. PCT/DE2007/001935, dated Jul. 16, 2009, 7 pages, International Bureau of WIPO, Geneva, Switzerland.

(Continued)

*Primary Examiner* — Brian P Werner
*Assistant Examiner* — Shefali Goradia
(74) *Attorney, Agent, or Firm* — W. F. Fasse

(57) ABSTRACT

A method for the automatic light control for a motor vehicle with a camera sensor for monitoring the environment in front of the motor vehicle is presented. With the camera sensor, an image sequence of the motor vehicle environment in front of the motor vehicle is recorded. The lane of the own motor vehicle is estimated from the image data. At least one evaluation window along the lane is set in the image, so that preceding and oncoming motor vehicles are recorded. Points of light in the image sequence are pursued (tracked). On the basis of the image data, the lights of other motor vehicles are detected, and the front headlights are controlled in such a manner that the drivers of other motor vehicles are not blinded.

7 Claims, 5 Drawing Sheets

U.S. PATENT DOCUMENTS

| | | |
|---|---|---|
| 2004/0143380 A1 | 7/2004 | Stam et al. |
| 2004/0164851 A1 | 8/2004 | Crawshaw |

FOREIGN PATENT DOCUMENTS

| | | |
|---|---|---|
| DE | 37 40 789 | 7/1996 |
| DE | 198 20 348 | 11/1999 |
| DE | 199 26 559 | 12/2000 |
| DE | 101 27 034 | 12/2002 |
| DE | 698 09 950 | 7/2003 |
| DE | 699 04 056 | 10/2003 |
| DE | 298 25 026 | 7/2004 |
| DE | 102004003502 | 8/2005 |
| DE | 102004060461 | 7/2006 |
| DE | 102006055906 | 6/2007 |
| JP | 06-276524 | 9/1994 |
| JP | 08-166221 | 6/1996 |
| WO | WO 99/10194 | 3/1999 |
| WO | WO 2004/034183 | 4/2004 |

OTHER PUBLICATIONS

Japan Patent Office, Japanese Office Action issued Apr. 17, 2012 in Japanese Patent Application 2009-540588, 3 pages, with English Translation 2 pages.

* cited by examiner

METHOD FOR AUTOMATIC FULL BEAM LIGHT CONTROL

CROSS-REFERENCE TO RELATED APPLICATIONS

This application is a 371 National Stage of PCT International Application PCT/DE2007/001935, which was filed on Oct. 29, 2007 and which claimed the priority of German Patent Application 10 2006 055 908.8 filed on Nov. 27, 2006.

FIELD OF THE INVENTION

The invention relates to a method for the automatic full beam light control of motor vehicle headlights, based on a camera sensor with which the motor vehicle environment is monitored.

BACKGROUND INFORMATION

An automatic light control system based on a photosensor is described in the disclosure DE 19820348. For this purpose, a highly sensitive photosensor is provided in the motor vehicle which is directed forwards in the direction of travel. The headlights of an oncoming motor vehicle impact the photosensor when a motor vehicle is approaching, and the full beam light is switched off. When a sufficiently low level of light intensity is again detected by the photosensor, when the oncoming motor vehicle has passed the own motor vehicle and is outside the recording area of the photosensor, the full beam light is switched back on again.

With this very simple method, only the light intensity is measured and the type of "light source", such as ambient light, reflectors, motor vehicle headlights, or street lighting, is not classified. This can lead to a dysfunction in the lighting control system.

SUMMARY OF THE INVENTION

The object of the invention is therefore to provide a reliable method for controlling the full beam lights of a motor vehicle.

This object is attained according to the invention by means of a method according to the independent patent claims. Advantageous further embodiments are described in the subclaims.

A method for the automatic light control for a motor vehicle with a camera sensor for monitoring the environment in front of the motor vehicle is presented. For this purpose, an image sequence is recorded and the lane of the own motor vehicle is determined from the image data. A lane estimation of this type is e.g. also a component of a lane departure warning or lane departure protection system. At least one evaluation window is set along the lane in the image, so that preceding and oncoming motor vehicles are recorded. Within an evaluation window, points of light are monitored in the image sequence. On the basis of the properties of points of light (e.g. spectral composition, time progression of the intensity, progression of movement in the image, absolute intensity etc.), the lights of other motor vehicles are detected. The front headlights are controlled in such a manner that drivers of other motor vehicles are not blinded.

In a particular embodiment of the method, a probability that the motor vehicle lights will return is calculated after the lights of a motor vehicle have left the recording area and before the motor vehicle headlights are switched to full beam. With a return probability above a specified threshold value, no transfer to full beam light occurs.

In a particular embodiment of the invention, a computing time optimised method for the pursuit (tracking) of points of light in an image sequence is used. For this purpose, for at least one point of light, a recording window is specified in which the point of light will be located to a high degree of probability in the images recorded later in time.

An advantageous embodiment of the invention makes use of the fact that motor vehicle lights usually occur in pairs in order to detect motor vehicles.

BRIEF DESCRIPTION OF THE DRAWINGS

The invention will now be explained in greater detail below with reference to exemplary embodiments and drawings, in which.

DETAILED DESCRIPTION OF EXAMPLE EMBODIMENTS OF THE INVENTION

Figure 1:
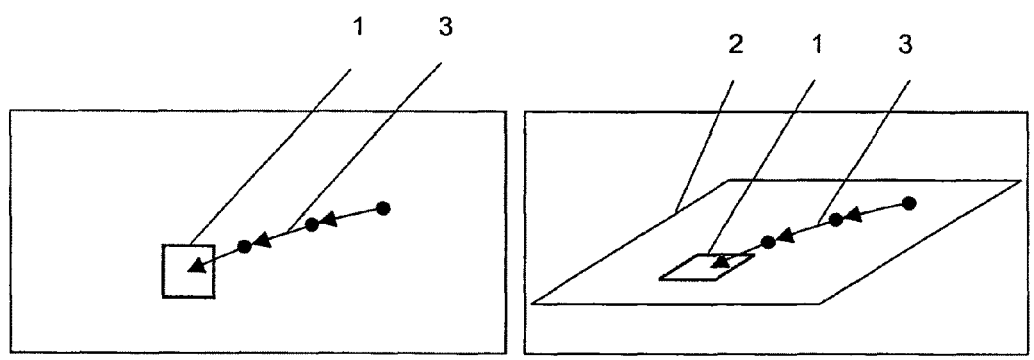
FIG. 1 shows a standard recording window (left) and a recording window which has been optimised for oncoming or preceding motor vehicles (right)

All the features described here can be contributed to the invention individually or in any required combination thereof. No particular time progression or sequence of the method stages or steps is necessitated by the sequence selected here.

Selection of a Suitable Image Section

In an exemplary embodiment of the invention, image sections (windows) are determined in which a search is made for motor vehicles. As a result of the window processing, the image processing complexity is significantly reduced, since it is no longer necessary to search the entire image for motor vehicles. Furthermore, when the lane is known, the window can be positioned onto the anticipated lane in such a manner that erroneous detections of objects on the side of the road are reduced. The size of the window is selected in such a manner that the motor vehicle objects being searched for fit in. An edge area is added which increases in size, the less precise the knowledge regarding the anticipated motor vehicle position is. The vertical position, width and height of the search window is positioned according to a distance hypothesis from the knowledge of the camera image equation (see section_Analysis of the movement of points of light in the image). The horizontal positioning of the window is achieved due to the knowledge of the progression of the lane in front of the motor vehicle from a preceding lane determination by means of image processing. This data is made available e.g. by a lane departure warning system which is integrated into the motor vehicle, a passenger assistance system (ACC), a digital card and satellite-supported position determination (e.g. from a navigation system), or from a route estimation which is achieved using inertial sensors. A lane detection with a camera is based e.g. on the detection of lane markings, the differentiation between the roadway and structures on the edge of the road, etc.

Probability of the Return of Motor Vehicle Lights

A probability of the return of motor vehicle lights which have left the evaluation window is estimated. If the probability of return lies above a specified threshold value, no transfer to full beam light is made. The determination of the probability of return can be based e.g. on one of the following scenarios:

When an oncoming or preceding motor vehicle leaves the evaluation window to the side or in a vertical direction, depending on the motor vehicle's own movement (pitch, yaw, rolling angle), a probability of the return of the other motor vehicle is calculated. When driving around curves, for example, the yaw rate of the own motor vehicle is used in order to determine the probability of the re-entry of another motor vehicle which leaves the evaluation window to the side in the direction of the yaw rate. With a rotation of the own motor vehicle (due to driving around a curve) in the "direction of leaving" of the other motor vehicle, the probability is high that the motor vehicle will again be visible in the evaluation window a short time later.

On a motorway or main road, bushes, poles, noise pollution reduction walls or similar non-continuous obstacles to visibility are located between the lanes with oncoming traffic. The lights of oncoming motor vehicles are visible, and then become invisible again. If for example the obstacles to visibility are recorded with the camera sensor and are detected with a subsequent evaluation algorithm, and if the points of light of an oncoming object (motor vehicle) have gone out, even though the trajectory of movement of the object has not yet reached the edge of the evaluation window, the probability is high that the oncoming motor vehicle will again be visible in the evaluation window a short time later.

Recording Windows when Pursuing Points of Light

For the time-related pursuit of points of light in an image sequence, a tracking filter is usually used. Here, a prediction regarding the position in the current image can be made from the time-related movement history. For the calculation of the recording areas 1, here, a constant distribution in the x/y direction is usually adopted in the image coordinate system. A case of this type is shown in FIG. 1, on the left-hand side. Here, an object trajectory 3 is shown with the usual recording area 1. The recording area 1 is selected in such a manner that the point of light will to a high degree of probability be located there in images which are recorded later. The recording window 1 is precisely assigned to a point of light or a pair of points of light, and cannot be confused with the evaluation window which defines the overall image range in which a search is made for points of light. In an advantageous embodiment of the invention, the evaluation windows are set in such a manner that only objects on the roadway are recorded. The recording window 1 is usually a partial section of the evaluation window, but exceptions are possible. Due to the movement history, the future direction of movement of other motor vehicles (oncoming or preceding) can also be determined to a high degree of probability. Under the prerequisite that the roadway in the recording area of the camera system is flat and has no hills, the movement of other motor vehicles runs at levels with a constant height. One level with a specified constant height in front of the motor vehicle with the camera sensor is shown in the camera image in an image section 2, which is specified by the direction of view and the display properties of the camera. A case of this type is shown on the right-hand side in FIG. 1. There, a section 2 is drawn into the camera image, which corresponds to a level in the environment of the motor vehicle with the camera system. The object trajectory 3 of an oncoming motor vehicle is contained in the section 2 of the camera image. The recording area 1 is specified in such a manner that it is part of the section 2. Furthermore, the recording area 1 is designed to be greater in the direction of movement of the object than in the direction opposite to the direction of movement. Due to the inclusion of the object trajectory of points of light the pursuit of points of light is more resistant to interference. Furthermore, due to the smaller search areas, the calculation complexity is reduced.

Double Lights

Figure 2:
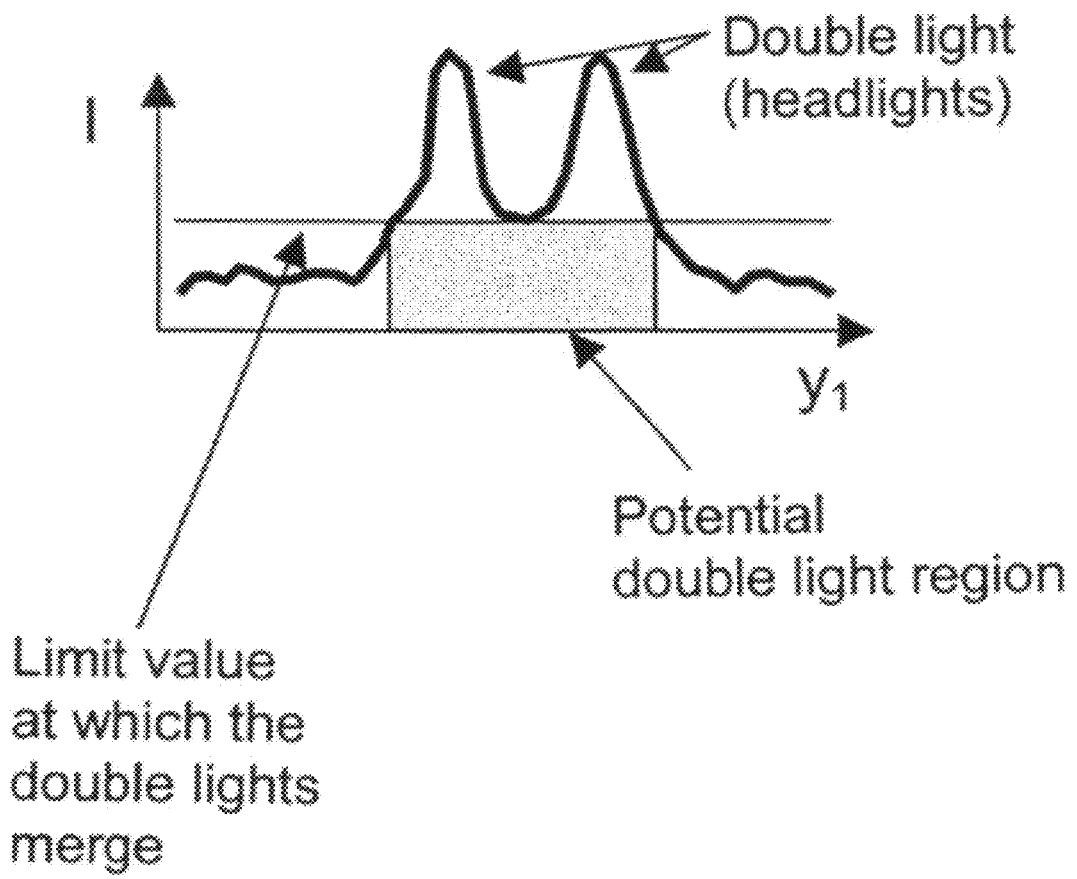
FIG. 2 shows the merging of motor vehicle lights

Headlights or tail lights usually occur in pairs, which can be used to detect motor vehicle objects in the dark. In order to detect a double light, a limit value is set for low brightness levels. This merges to form a large light region with the double lights (and reflections of the headlights on the road). This is shown in FIG. 2. The intensity I is applied in a pixel line y1. The limit value of the intensity in which the double lights merge is applied as a continuous line parallel to the abscissa.

Methods will now be given as examples to illustrate how the properties of the points of light (e.g. spectral merging, time progression of the intensity, progression of movement in the image, absolute intensity etc.) can be used to detect the lights of other motor vehicles. The methods can be used either individually or in any combination required.

Analysis of the Intensity of Points of Light

I) Analysis of the Time-Related Intensity Fluctuations of Points of Light

Figure 3:
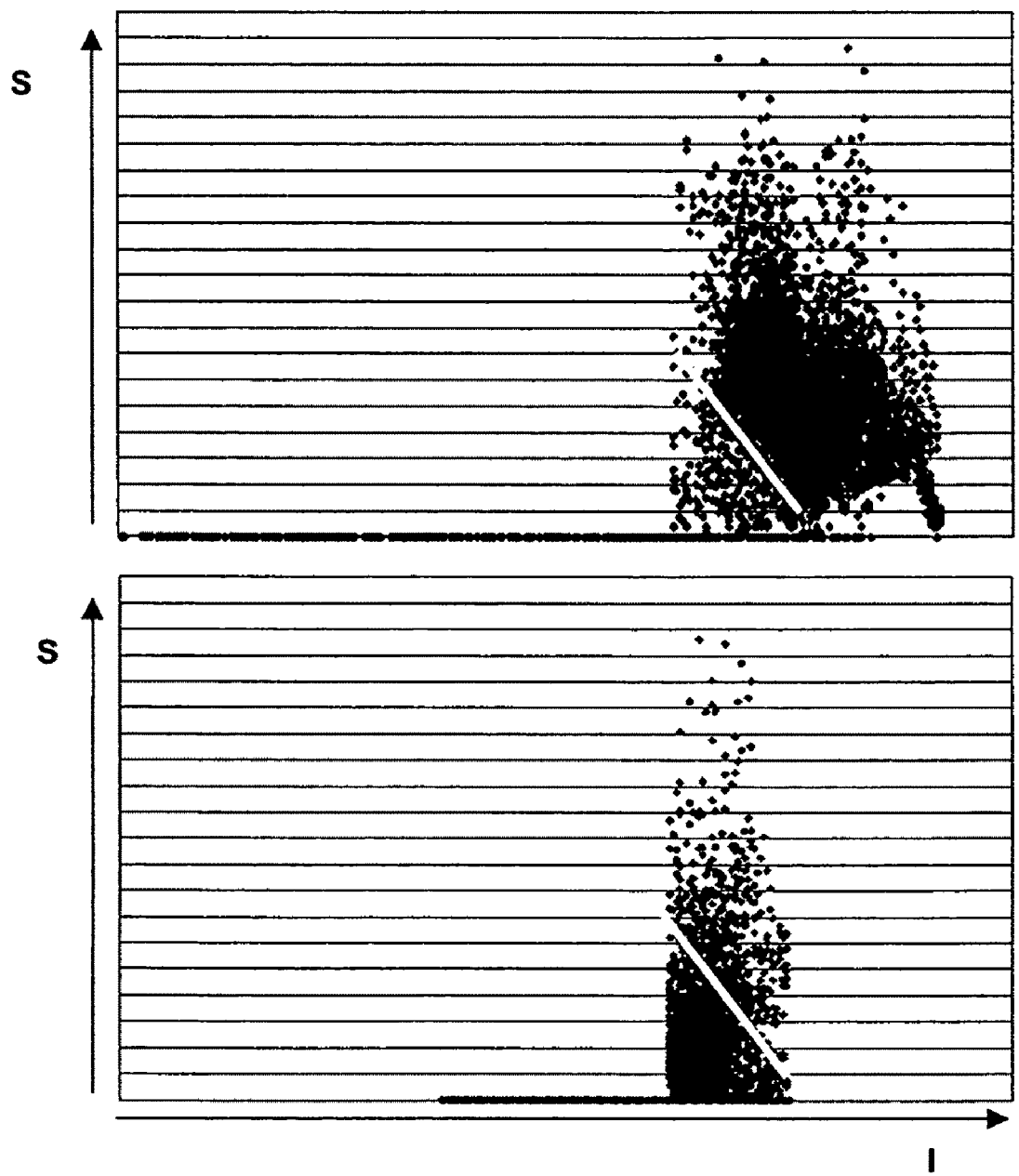
FIG. 3 shows the intensity fluctuation S applied over the intensity I for oncoming front headlights (above) and reflectors (below) in a pre-specified intensity range

If a point of light is detected, it is pursued (tracked) in the succession of images. The intensity of a pursued point of light is determined in a large number of images, and the intensity progression is analysed. Here, the fluctuation of the intensity around an average value is of particular interest. Since the intensity of a point of light depends on the distance which usually constantly changes in a moved motor vehicle with the camera, a continuous average value is used to determine the intensity fluctuation. An alternative method of showing the intensity fluctuation is to determine the stroke of successive measurement values. Preferably, the total value of the stroke is applied over the intensity. In FIG. 3 above, the intensity fluctuation is applied for oncoming light sources, and in 2 below, for reflectors in a specified intensity range. It can immediately be seen that the determined intensity fluctuation in the specified intensity range is on average significantly higher for the headlight of an oncoming motor vehicle than the intensity fluctuation for a reflector. In both drawings, FIG. 3 above and 3 below, the same white line is drawn for clarification purposes. In FIG. 3 above (oncoming motor vehicle headlights), there is a clear predominance of intensity fluctuation above the line, while in FIG. 3 below (reflectors marking the roadway), the clear predominance of variance values is arranged below the line. The cause of the different behaviour of the variance is the specific reflection characteristics of reflectors which reflect back the light in the direction from which it has come. Since headlights and camera sensors in a motor vehicle are both subject to the same inherent movement of their own motor vehicle, the incident angle of the reflected light onto the camera chip, and thus the intensity of the point of light, is comparatively constant. If a light source is present, at least their own motor vehicle which carries the camera has its own movement, such as a pitch movement. The incident angle of the light on the camera chip and thus the intensity of the point of light in the image has a comparatively low constancy. This property is used to differentiate between a reflector and a self-radiating light source. Points of light of which the intensity fluctuation values are arranged predominantly below the boundary line are classified as reflectors. Points of light of which the intensity fluctuation values lie predominantly above the line are recognised as self-radiating points of light. The progression of such a boundary line can be firmly specified in a data processing programme. An alternative is to adapt the progression of the boundary line to measured values which have previously been recorded. For this purpose, the variance values of the points of light and their classification (reflector, self-radiating light source) are regarded retrospectively. The classification can be made with the aid of the variance criterion and/or other methods. The boundary line is thus calculated in such a manner that as few variance values as possible from the reflectors lie above the line, and as few variance values as possible from self-radiating light sources lie below the line.

II) Analysis of the Absolute Intensity of Points of Light

Figure 4:
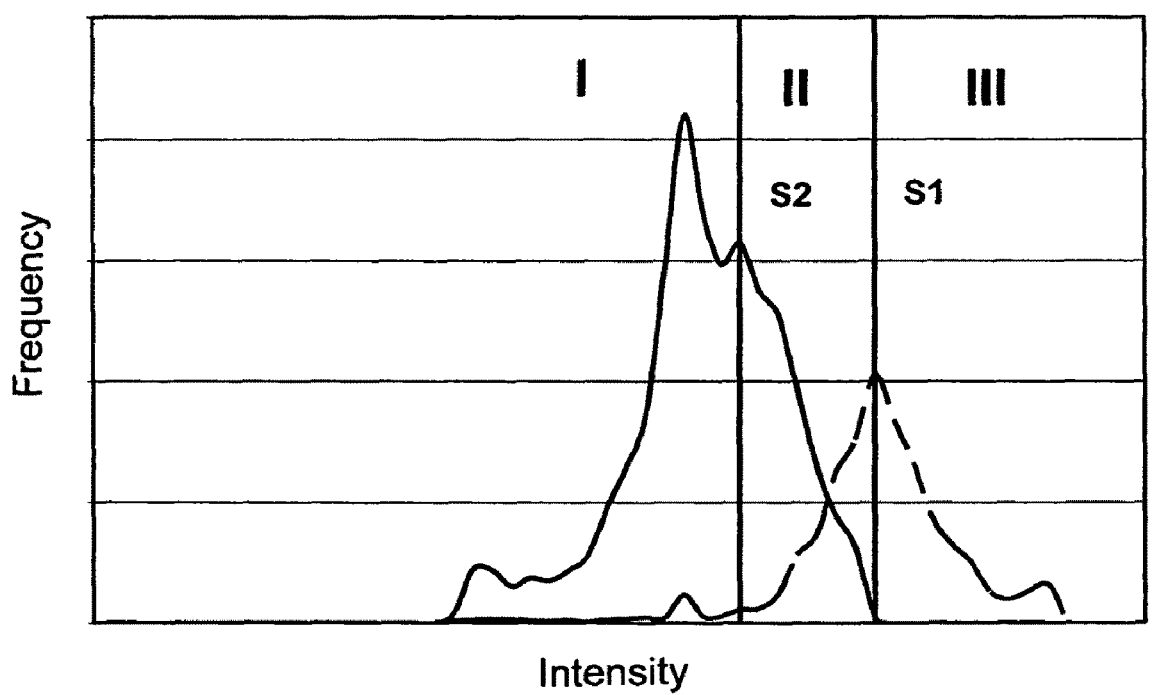
FIG. 4 shows a schematic frequency distribution of the intensity of reflectors and motor vehicle lights

The intensity of the light of the motor vehicle's own headlights which is reflected back from reflectors is proportionate to $1/x^4$. Wherein x indicates the distance between the reflector and the motor vehicle. By contrast, the intensity of self-radiating light sources, usually motor vehicle headlights, is proportionate to $1/x^2$. In other words, at the same distance, motor vehicle headlights of an oncoming motor vehicle are shown as being brighter in the image than reflectors which reflect the headlight light of their own motor vehicle. A typical frequency distribution over the intensity is shown in FIG. 4. The frequency distribution of self-radiating light sources is shown with a broken line, and that of reflectors is shown with an unbroken line. It can clearly be seen that the frequency distributions are offset from each other. In the drawing, three intensity ranges can be identified. In the low intensity range marked I, only reflectors are shown, in the middle intensity range, reflectors and self-radiating light sources are shown, and in the high intensity range marked III, only self-radiating light sources are shown. Accordingly, points of light with an intensity above an upper threshold value S1 are caused by a headlight. Points of light with an intensity below a lower threshold value S2 are caused to a high degree of probability by a reflector. If a point of light has an intensity which lies between the two threshold values S1 and S2, no statement can be made with this method as to whether a reflector or a self-radiating light source is present.

III) Analysis of the Degrees of Intensity

Furthermore, the intensity progression of the at least one point of light is recorded. The intensity of the light from the motor vehicle's own headlights which is reflected back from reflectors is proportionate to $1/x^4$. Wherein x indicates the distance between the reflector and the motor vehicle. In other words, based on the time intensity progression, a point of light can be classed as a passive light source (reflector) or as an active, self-radiating light source. This assignment is verified in a preferred embodiment of the invention on the basis of the determined distance of the point of light and the knowledge of the luminance of the motor vehicle's own headlights and the reflection properties of standard reflectors on the edge of the road. In one embodiment of the invention, the distance determination is used in order to determine a probably intensity progression for a passive and an active light source, and to be used for verification purposes as to whether a reflector or an active light source is present. Equally, in a preferred embodiment of the invention, the intensity of the measured point of light is compared with the anticipated intensity of a front headlight or of a tail light of the standard luminance at the determined distance. The same prediction is made for standard reflectors in the determined distance, assuming the radiance from the motor vehicle's own front headlights. The calculated values are used to verify whether a reflector or an active light source (motor vehicle lights) are present.

In the method presented here, a point of light is identified as a reflector when the time progression of the movement of the point of light essentially conforms to the behaviour of an object which is stationary relative to the roadway, and the time progression of the intensity essentially corresponds to the anticipated progression for a passive light source. Furthermore, a point of light is identified as a motor vehicle light when the time progression of the movement of the point of light essentially conforms to the behaviour of an object which moves relative to the roadway, and the time progression of the intensity essentially corresponds to the anticipated progression for an active light source.

Analysis of the Movement of Points of Light in the Image

I) Image Flow

In order to detect motor vehicle lights, the optical flow of bright, punctiform image objects is determined which are extracted using known image processing methods (correlation, morphological filtering, region segmentation). If the image flow of these image objects is in tune with the motor vehicle's own movement (speed, yaw), it can be assumed that stationary points of light are present. For this purpose, the hypothetical image flow for stationary image points is determined at different distances and is compared with the actual image of the points of light which have been extracted from the current image. If the image flow of said points of light is essentially dominated by the known movement (speed, yaw), these points of light are stationary. If none of the hypotheses for the measured image flow of a point of light applies, the point of light must be a moving light. With the differentiation, the approximate knowledge of the distance between the points of light shown and the motor vehicle is useful, since the image flow depends on the distance of the points of light as well as the own movement of the camera motor vehicle and the possible movement of the points of light. Objects at close range have a stronger image flow than objects located at a distance.

One method of determining the distance of a point or object d with a monocular camera is shown. The distance to the monocular camera is determined from h the camera installation height, α the camera pitch angle, y the image line of the point, η the pixel size and f the focal length of the camera $$d = h \cdot \frac{1 - t \cdot \tan\alpha}{t + \tan\alpha} \text{ with } t = y \cdot \frac{\eta}{f}$$

If the forenamed parameters are therefore known following an adjustment of the direction of view of the camera, the distance d can be determined.

II) Fault Caused by the Pitch Movement of the Own Motor Vehicle

A problem which frequently arises when evaluating the direction of movement of a light source is the swaying of the body of the own motor vehicle and thus of the camera. This causes the image flow of objects to be influenced not only by the speed and yaw of the camera motor vehicle, but also by the rotational movement of the body relative to the roadway surface, the pitch movement of the motor vehicle. In contrast to the speed and yaw, the pitch movement cannot simply be measured by sensors. This fault occurs to a greater extent when the roadway surface is uneven, and during longitudinal acceleration (in a positive and negative direction). Regardless of how well the chassis of the camera motor vehicle is able to dampen the forces which are created during this process, faults are always present due to pitch movements.

Figure 5:
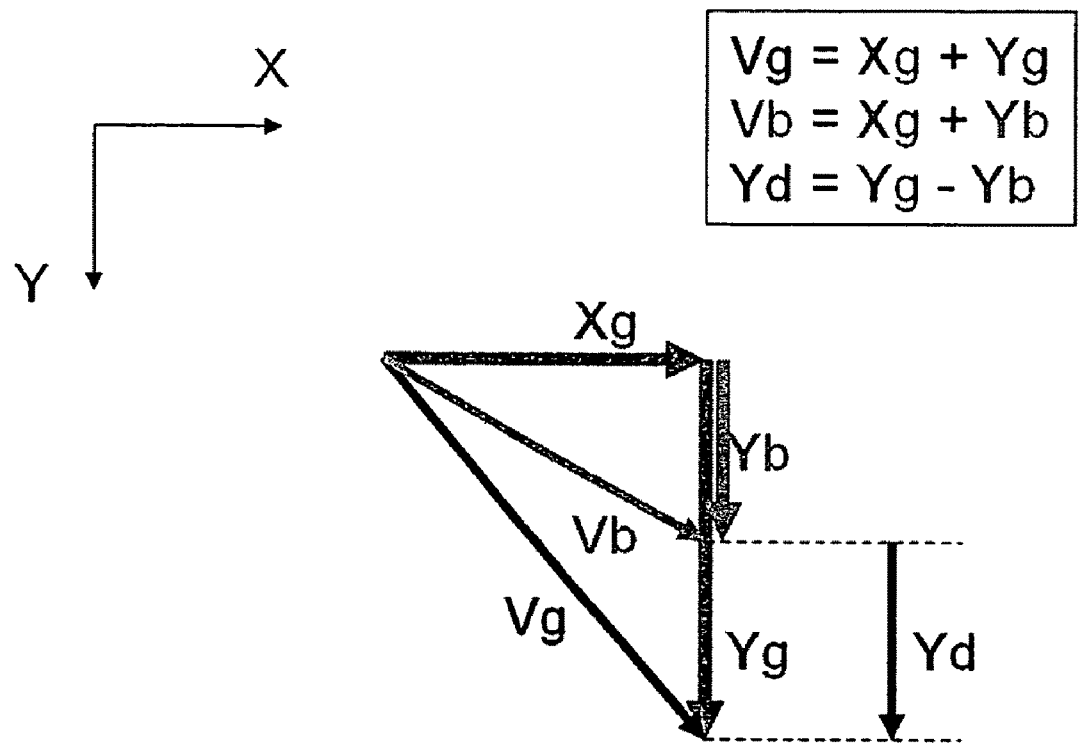
FIG. 5 shows a pitch movement

In the following, an option is presented for determining the pitch movement in order to enable a subsequent compensation. For this purpose, the camera images themselves are analysed. If the chassis dips forward, the camera inclines downwards and all points in the video image are displaced upwards accordingly; conversely, the points move downwards when the motor vehicle body springs back again. Use can now be made of the fact that this movement is the same in the video image for all points, and only occurs in a vertical direction, i.e. the horizontal movement component of the image points remains uninfluenced by the pitch movement of the camera. On the assumption that a stationary object is present with an image point under consideration, the distance between this point and the camera can be calculated from its position in the image, known speed and yaw of the camera motor vehicle, as well as solely from its horizontal displacement. A determination can be made e.g. on the basis of the analysis of the intensity in an image sequence as to whether the object is stationary or moving. If the distance of the point from the horizontal displacement is known, the associated vertical displacement can therefore be determined in turn. Since the horizontal displacement of the point, as explained above, is independent of the pitch movement, this now also applies to the determined corresponding vertical displacement. If the displacement measured in the video image is interfered with by the pitch movement of the camera, this is detected due to a difference between the measured and the calculated vertical displacement. With the determined pitch movement, the corresponding image data can now be corrected. In FIG. 5, the determination of the pitch angle is shown schematically as a vector diagram. Vg represents the overall displacement of an object measured in the image. This vector can be divided into the measured overall displacement in the X direction Xg and in the Y direction Yg. Yb refers to the calculated displacement in the Y direction, which, as was explained above, has been calculated for a stationary object. Yd gives the precise difference between the calculated and the measured displacement in the Y direction, and thus also the influence of the pitch movement.

The invention claimed is:

1. A method for automatic light control for a subject motor vehicle with a camera sensor for monitoring the environment in front of the subject motor vehicle, comprising the steps:

recording image data as an image sequence of the subject motor vehicle's environment;

estimating a lane of the subject motor vehicle from the image data;

setting at least one evaluation window along the lane in the image sequence and recording preceding and oncoming other motor vehicles;

tracking points of light in the image sequence which are located in the at least one evaluation window;

from the image data, detecting motor vehicle lights of other motor vehicles; and controlling front headlights of the subject motor vehicle in such a manner that drivers of other motor vehicles are not blinded.

2. The method according to claim 1, further comprising, after the lights of an other motor vehicle have left the evaluation window, determining a return probability of a return of the other motor vehicle's lights into the evaluation window before changing from low beam to high beam headlights, and when the return probability is above a specified threshold value, then not changing to high beam headlights.

3. The method according to claim 2, characterized in that the return probability is determined, depending on a movement of the subject motor vehicle with respect to at least one of a pitch, a yaw and a rolling angle of the subject motor vehicle, when an oncoming or preceding motor vehicle leaves the evaluation window to a side or in a vertical direction.

4. The method according to claim 2, characterized in that the return probability for points of light that are extinguished within the evaluation window although their trajectory of movement has not yet reached the edge of the evaluation window is evaluated as being high, depending on recorded, non-continuous obstacles to visibility between lanes with oncoming traffic.

5. The method according to claim 1, characterized in that for carrying out the tracking of points of light in the image sequence for at least a selected one of the points of light in a manner that optimizes a required computing time, a recording window (1) is specified, including an object trajectory (3) of the selected point of light, in which recording window the selected point of light is expected to be located to a high degree of probability in images of the image data to be recorded later in time.

6. The method according to claim 1, wherein the step of detecting the motor vehicle lights comprises examining the image data for points of light occurring in pairs.

7. A motor vehicle with a camera sensor for a driver assistance system for recording the lane, further equipped with means for performing the method for the automatic light control according to claim 1.

* * * * *